Aug. 11, 1936.    R. M. WILHELM    2,051,015
DAIRY THERMOMETER
Filed Aug. 20, 1935
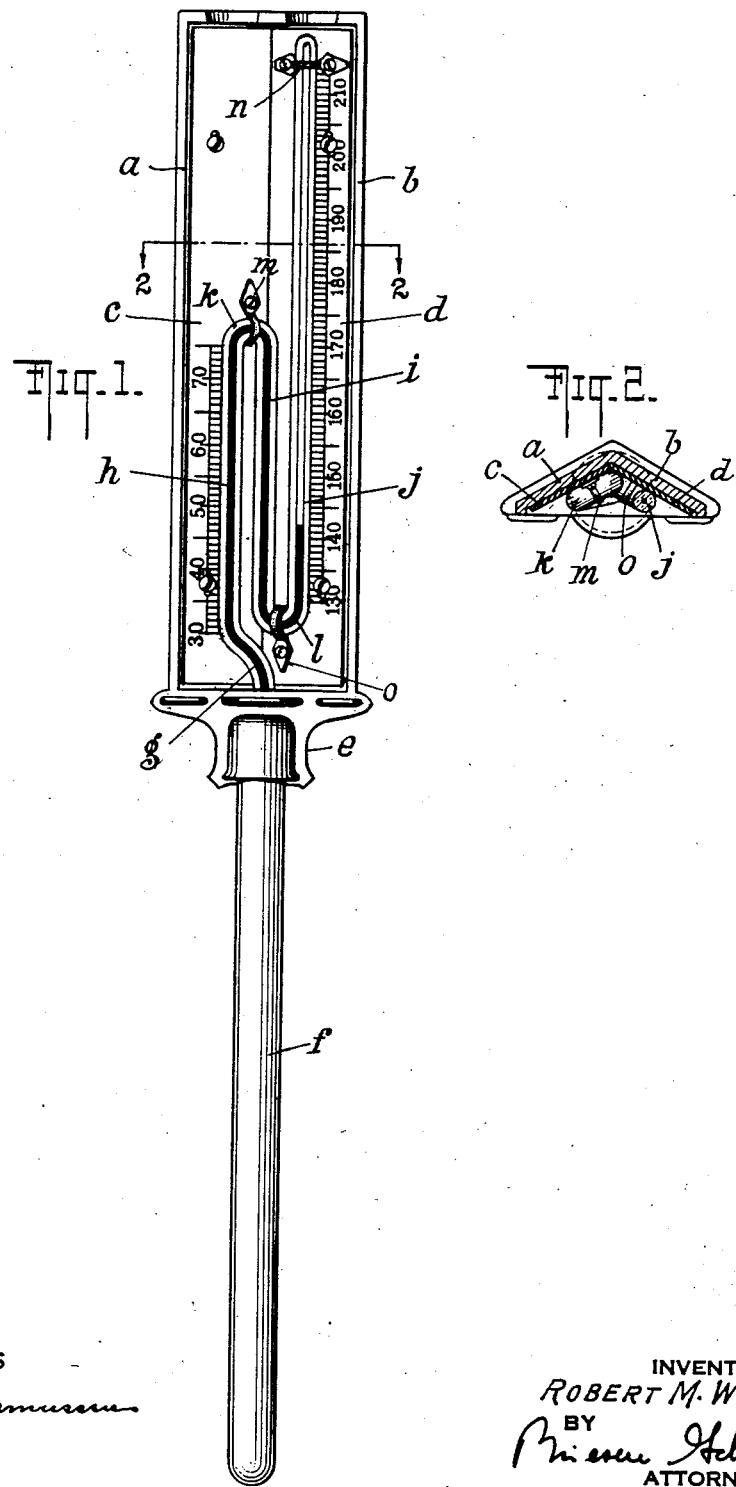
WITNESS
G. V. Rasmussen
INVENTOR
ROBERT M. WILHELM
BY
ATTORNEYS Patented Aug. 11, 1936

2,051,015

UNITED STATES PATENT OFFICE 2,051,015

DAIRY THERMOMETER

Robert M. Wilhelm, Rockville Centre, N. Y., assignor to C. J. Tagliabue Mfg. Co., Brooklyn, N. Y., a corporation of New York Application August 20, 1935, Serial No. 36,965

6 Claims. (Cl. 73—52)

This invention relates to thermometers and more particularly to dairy thermometers for use in the temperature treatment of milk, cream and the like.

A dairy thermometer of the indicating type must comply with all Federal, State and municipal health code regulations before it can be universally accepted. A requirement of the United States Public Health Service and many state and local health authorities is that dairy thermometers shall have a scale graduated in single degree divisions of not less than $\frac{1}{16}$ of an inch. The most important ranges of temperature involved in dairy practice include cooling temperatures lying between 35° and 65° F. an aging temperature at 70° F., and pasteurizing temperatures, which under Federal and certain State and municipal regulations, must be indicated on a scale graduated from 130° to 210° F. Furthermore, the vats are required to be sterilized frequently at temperatures of up to approximately 220° F. A straight thermometer tube having a range from 35° to 220° F. and having a uniform bore size of such diameter that the single degree divisions are not less than $\frac{1}{16}$ of an inch would therefore have a scale at least twelve inches in length. Add to that the additional length required in the case and support of the thermometer above and below the scale and it will be evident that such a thermometer case would be substantially greater than twelve inches in length. As the desirable length of the scale case for dairy thermometers is either seven or nine inches and preferably seven inches, a thermometer of such undue length would not be acceptable to the milk industry.

A universal thermometer which would satisfy all the aforesaid requirements and meet Federal and State regulations was much sought for by the dairy industry, but the best that thermometer makers could do for a long time, in the face of the apparently insuperable contradictory size requirements of the parts, was to make separate instruments to take care of the separate diverse situations. Within the last three or four years, it has been proposed to reduce the length of the thermometer by providing the base of the thermometer tube with an enlargement at a point intermediate the ends of the scale, or by employing thermometer tubing with two different bore sizes, or by using sections of the thermometer tubing joined together, the bore sizes of which are also different. By these expedients, thermometer manufacturers have been enabled to provide dairy thermometers which are sufficiently short so that they can be contained within scale casings of not more than nine inches in length and yet which have the necessary contradicting requirements of temperature range and the full $\frac{1}{16}$ inch single degree spacings. While these prior dairy thermometers have proven fairly satisfactory, they have, however, certain disadvantages, for example, those thermometers which are provided with an expansion chamber in the bore of the thermometer tube possess an inherent defect in that separations are liable to occur in the mercury column at the enlarged portion of the bore. This type of thermometer is also unacceptable under certain State and municipal requirements as the straight thermometer tube cannot be made short enough to be contained in a nine inch scale casing and still have the so-called "cooling" range of 35° to 70° F. and a pasteurizing range of 130° to 210° F. with one degree divisions of $\frac{1}{16}$ of an inch. The principal objection to those thermometers which are provided with bore sections of different diameters is that the graduations of the scale are different at different parts of the thermometer which may confuse the observer or cause him to obtain an incorrect reading, especially so when one portion of the scale is graduated in single degrees and the other and less important portion is graduated in two degree divisions as is frequently done. Another objection is that it has not been possible to include the cooling and pasteurizing ranges in a seven inch scale case.

It is the purpose of the present invention to provide a new dairy thermometer which will comply with the requirements of Federal and all State and municipal health codes, will function in a most reliable fashion, will be easily readable and which can be incorporated in a scale case as short as seven inches.

A thermometer embodying the present invention is illustrated in the accompanying drawing in which Fig. 1 is a front elevation of the new thermometer and Fig. 2 is a section of the same taken along the line 2—2 of Fig. 1.

The thermometer illustrated in the drawing comprises a scale casing having side walls $a$ and $b$ which are disposed in converging relation with each other and meet at their rear edges so that a horizontal cross-section thereof is V-shaped, as shown in Fig. 2. Supported on the inner surfaces of the walls $a$ and $b$ are two converging scale plates $c$ and $d$, the scale plate $c$ which is mounted on the wall $a$ having graduations which indicate the cooling range and aging temperature and the scale plate d which is mounted on the wall b having graduations which indicate the pasteurizing range of the thermometer. The scale plates are secured in position on said walls in any suitable manner, as by screws which extend through apertures in the scale plates and threadedly engage with the scale casing walls. The lower end wall of the casing has integrally formed therewith a section e for receiving the upper end portion of a closed end tube or stem which is adapted to be positioned within the vat containing the dairy product to be treated, this stem being indicated by the reference character f. The stem serves as a protection for the glass thermometer tube and bulb which are filled with mercury or other expansible fluid. The glass stem communicates at its upper end with the lower end of the glass thermometer tube section g.

The upper portion of the thermometer tube is serpentinely arranged in the scale casing and as is clearly shown in Fig. 1 of the drawing comprises a lower end section g which curves upwardly from the aperture provided in the lower end wall of the scale casing into contact with the lower end portion of the scale plate c and the vertically disposed straight parallel sections h, i and j. The section h which communicates at its lower end with the curved end section g, extends up along the surface of the scale plate c and communicates at its upper end with a bent section k which connects it with the upper end of the straight parallel section i. The bent section k is formed so that it lies against the surface of the scale plate c and extends over to the line along which the edges of the converging scale plates c and d meet whereby the section i is disposed against the meeting edge portions of the scale plates and to the rear of section h. The section i communicates at its lower end with a bent section l formed to lie against the surface of the scale plate d and which connects the section i with the lower end of the straight section j, the latter of which extends up along the surface of the scale plate d and is sealed at its upper end. The bore extending through the several sections of the thermometer tube is substantially uniform throughout so that no separation of the mercury column will occur during the operation of the instrument and is of such diameter, at least in the straight sections h and j, that the spacings between the single degree divisions on the scale plates c and d which are associated with said sections h and j are not less than $\frac{1}{16}$ of an inch. The straight tube section h is so arranged with relation to the bulb f and the curved section g that the temperature reading at its lower end is 30° F. and is of such length that the temperature reading at its upper end is 70° F., which range includes the cooling temperatures and aging temperature involved in dairy practice. The straight section i and the bent sections k and l are sufficiently long to take care of a rise in temperature from 75° to 130° F. and as such range is relatively unimportant in dairy practice it need not be graduated. The straight section j is substantially longer than the straight sections h and i and is adapted to take care of a rise in temperature from 130° to 210° F. which is the pasteurizing range required in dairy practice. The straight section j is also provided with an expansion chamber to allow for a rise in temperature up to 220° F. In the preferred form of the instrument the space above the mercury column is filled with nitrogen gas which is injected into the thermometer at the time of manufacture in order to assure that the mercury column will not separate when rising to a pasteurizing temperature, or dropping from the pasteurizing range to the cooling range. In order to enable the reader to find the top of the mercury column more readily, a color contrast may be provided for between the mercury in the bore and the bore where it contains no mercury by coloring either the bore or the mercury column in a manner well known in the art. The thermometer tube is held securely in place in the casing by means of clips m and o, which are screwed to the scale plates c and d, respectively, and engage with the bent tube sections k and l, respectively, and a holding member n which is secured to the scale plate d and engages with the sealed end portion of the tube section j.

It will be observed that by arranging a thermometer tube of substantially uniform diameter in the manner above described so that a short leg is provided for the cooling temperature and a long leg for the temperatures involved in the pasteurizing range, I am enabled to accomplish the desirable object of supplying a dairy thermometer which will function satisfactorily during use, will be easily readable as the scale divisions are the same on both scale plates and will comply with all requirements of Federal, State, and local authorities. The thermometer illustrated in the drawing has a seven inch scale case within which all the combined working ranges with $\frac{1}{16}$ inch degree separations are accommodated.

While I have illustrated and described a preferred embodiment of my invention, it is apparent that numerous modifications may be made in the thermometer without departing from the scope of the invention as covered by the appended claims whose purpose it is to include and embrace any such modifications or equivalents. For example, instead of forming the curved sections k and l so that they are turned inwardly, they may be formed so as to be in the same plane as the tube sections h and j, thus making it possible to use a rectangular shaped flat case. The legs of the thermometer may also be arranged so as to contain them in a casing which has a shape other than rectangular or that illustrated in the drawing and may be non-parallel with each other. Nor need the stem f be disposed longitudinally with the scale case as it may be desirable to have it disposed in angular relation with the case.

I claim:

1. A dairy thermometer comprising a bulb for placement in a vat, a scale case, a thermometer tube bent twice upon itself arranged in said scale case and having a short leg section connected with said bulb, a long leg section sealed at its outer end and an intermediate section connecting said long and short leg sections, said short leg section being spaced from the upper end of said scale case and so arranged with relation to the bulb that it is adapted to accommodate the expansion of the temperature-indicating fluid of the thermometer in the regions between at least 35° F. and at least 70 F. and the graduated readable portion of said long leg section being substantially longer than either said short leg section or said intermediate section and so arranged with relation to said sections that it is adapted to accommodate the expansion of the temperature-indicating fluid in the regions between at least 130° F. and at least 210° F. and a group of graduations related to each of said short and long leg sections for indicating the cooling, aging and pasteurizing temperatures involved in dairy practice, the graduations of each group having spacings of at least 1/16 inch therebetween and representing single degree divisions in the temperature ranges of the sections.

2. A dairy thermometer comprising a bulb for placement in a vat, a scale case of limited length of the order of seven inches, a thermometer tube bent twice upon itself arranged in said scale case and having a short leg section connected with said bulb, a long leg section sealed at its outer end and an intermediate section connecting said long and short leg sections, said short leg section being spaced from the upper end of said scale case and so arranged with relation to the bulb that it is adapted to accommodate the expansion of the temperature-indicating fluid of the thermometer in the temperature range involved in dairy practice which includes cooling temperatures of 35° to 65° F. and an aging temperature of 70° F. and the graduated readable portion of said long leg section being substantially longer than either said short leg section or said intermediate section and so arranged with relation to said sections that it is adapted to accommodate the expansion of the temperature-indicating fluid in the pasteurizing temperatures used in dairy practice up to approximately 220° F. and a group of graduations related to each of said short and long leg sections for indicating the cooling, aging and pasteurizing temperatures involved in dairy practice, the graduations of each group having spacings of at least 1/16 inch therebetween and representing single degree divisions in the temperature ranges of said sections.

3. A dairy thermometer comprising a bulb for placement in a vat, a scale case of limited length of the order of seven inches, a thermometer tube arranged in said case and having a short leg section connected with said bulb, a long leg section disposed in parallel relation with said short leg section and an intermediate section positioned between said long and short leg sections and connecting them together, the bore through said several thermometer sections being continuous, said short leg section being spaced from the upper end of said scale case and so arranged with relation to the bulb that it is adapted to accommodate the expansion of the temperature-indicating fluid of the thermometer in the temperature range involved in dairy practice which includes cooling temperatures of 35° to 65° F. and an aging temperature of 70° F. and the graduated readable portion of said long leg section being substantially longer than either said short leg section or said intermediate section and so arranged with relation to said sections that it is adapted to accommodate the expansion of the temperature-indicating fluid in the pasteurizing temperatures used in dairy practice up to approximately 220° F. and a group of graduations related to each of said short and long leg sections for indicating the cooling, aging and pasteurizing temperatures involved in dairy practice, the graduations of each group having spacings of at least 1/16 inch therebetween and representing single degree divisions in the temperature ranges of the sections.

4. A dairy thermometer comprising a bulb for placement in a vat, a scale case having a V-shaped backing, a pair of scale plates disposed in converging relation in said scale case, a thermometer tube arranged in said case and having a short leg section connected with said bulb and extending along one of said scale plates, a long leg section extending along the other of said scale plates and being sealed at its outer end and an intermediate section connecting said long and short leg sections and disposed to the rear of said sections, said short leg section being spaced from the upper end of said scale case and so arranged with relation to the bulb that it is adapted to accommodate the expansion of the temperature-indicating fluid of the thermometer in the temperature range involved in dairy practice which includes cooling temperatures of 35° to 65° F. and an aging temperature of 70° F., the graduated readable portion of said long leg section being substantially longer than either said short leg section or said intermediate section and so arranged with relation to said sections that it is adapted to accommodate the expansion of the temperature-indicating fluid in the pasteurizing temperatures used in dairy practice up to approximately 220° F. and said scale plates each bearing a group of graduations related to the associated sections, for indicating the cooling, aging and pasteurizing temperatures involved in dairy practice, the graduations of each group having spacings of at least 1/16 inch therebetween and representing single degree divisions in the temperature ranges of said sections.

5. A dairy thermometer comprising a bulb for placement in a vat, a scale case, a thermometer tube provided with a capillary bore of substantially uniform diameter for an expansible temperature-indicating fluid and arranged in said scale case, said thermometer tube having a section spaced from the upper end of said scale case and so arranged with said bulb that it is adapted to accommodate the expansion of the indicating fluid in the regions between at least 35° F. and at least 70° F. and having a second section connected with said first mentioned section and disposed in spaced parallel relation to the latter, the graduated readable portion of said second section being substantially longer than said first section and so arranged with relation to said first section that it is adapted to accommodate the expansion of the temperature-indicating fluid in the regions between at least 130° F. and 210° F., a group of graduations related to each of said sections for indicating the cooling, aging and pasteurizing temperatures involved in dairy practice, the graduations of each group having spacings of at least 1/16 inch therebetween and representing single degree divisions in the temperature ranges of the sections and a column of compressible gas intermediate the temperature-indicating fluid and the sealed end of the thermometer.

6. A dairy thermometer comprising a bulb for placement in a vat, a thermometer tube support, a thermometer tube having connection with said bulb and carried by said support, said tube having a plurality of spaced portions, one of said portions being longer than the others, one of said short portions being adapted to indicate temperatures in the cooling and aging range used in dairy practice and being bent away from its longitudinal direction at a point slightly above the aging temperature used in dairy practice, said longer portion being adapted to indicate temperatures in the pasteurizing range involved in dairy practice and being bent away from its longitudinal direction at a point just below the lowest temperature in the pasteurizing range and an intermediate portion representing the preheating range used in dairy practice connecting the bent portions of said shorter and longer portions, a scale associated with said first mentioned short portion and bearing graduations from at least 35° F. to at least 70° F. for indicating the cooling and aging temperatures involved in dairy practice and a scale associated with said longer portion and bearing graduations from at least 130° F. to at least 210° F. for indicating the pasteurizing temperatures involved in dairy practice, the graduations on each scale having spacings of at least $\frac{1}{18}$ of an inch therebetween and representing single degree divisions in the temperature ranges of said tube portions.

ROBERT M. WILHELM.